(12) United States Patent
Mauricia et al.

(10) Patent No.: US 12,122,294 B2
(45) Date of Patent: *Oct. 22, 2024

(54) SYSTEMS AND METHODS FOR VERIFYING WHETHER VEHICLE OPERATORS ARE PAYING ATTENTION

(71) Applicant: SmartDrive Systems, Inc., Westlake, TX (US)

(72) Inventors: Juan Carlos Mauricia, San Diego, CA (US); Daniel Andrew Deninger, Carlsbad, CA (US); Reza Ghanbari, San Diego, CA (US); Mark Freitas, San Diego, CA (US); Jeffrey Griswold, San Diego, CA (US); David Forney, La Jolla, CA (US); Nicholas Shayne Brookins, Encinitas, CA (US); Jason Palmer, Carlsbad, CA (US)

(73) Assignee: SmartDrive Systems, Inc., Westlake, TX (US)

( * ) Notice: Subject to any disclaimer, the term of this patent is extended or adjusted under 35 U.S.C. 154(b) by 200 days.

This patent is subject to a terminal disclaimer.

(21) Appl. No.: 17/725,257

(22) Filed: Apr. 20, 2022

(65) Prior Publication Data

US 2022/0242310 A1     Aug. 4, 2022

Related U.S. Application Data

(63) Continuation of application No. 17/073,077, filed on Oct. 16, 2020, now Pat. No. 11,364,844, which is a
(Continued)

(51) Int. Cl.
*B60Q 9/00* (2006.01)
*B60W 50/14* (2020.01)
(Continued)

(52) U.S. Cl.
CPC ............... *B60Q 9/00* (2013.01); *B60W 50/14* (2013.01); *B60W 2050/0088* (2013.01);
(Continued)

(58) Field of Classification Search
CPC ..... B60Q 9/00; B60W 50/14; B60W 2552/00; B60W 2554/00; B60W 2556/00;
(Continued)

(56) References Cited

U.S. PATENT DOCUMENTS

| 929,017 A | 7/1909 | Reynard |
| 2,008,008 A | 7/1935 | Enos |

(Continued)

FOREIGN PATENT DOCUMENTS

| DE | 102012112802 | 6/2014 |
| EP | 3125211 | 2/2017 |

OTHER PUBLICATIONS

International Search Report and Written Opinion for PCT/IB17/56336, dated Jan. 12, 2018 (9 pages).

*Primary Examiner* — Chico A Foxx
(74) *Attorney, Agent, or Firm* — Esplin & Associates, PC (57) ABSTRACT

Systems and methods for verifying whether vehicle operators are paying attention are disclosed. Exemplary implementations may: generate output signals conveying information related to a first vehicle operator; make a first type of determination of at least one of an object on which attention of the first vehicle operator is focused and/or a direction in which attention of the first vehicle operator is focused; make a second type of determination regarding fatigue of the first vehicle operator; make a third type of determination of at least one of a distraction level of the first vehicle operator and/or a fatigue level of the first vehicle operator; and
(Continued)

effectuate a notification regarding the third type of determination to at least one of the first vehicle operator and/or a remote computing server.

14 Claims, 3 Drawing Sheets

Related U.S. Application Data continuation of application No. 16/400,806, filed on May 1, 2019, now Pat. No. 10,807,527.

(51) Int. Cl.
  *B60W 50/00* (2006.01)
  *G05D 1/00* (2006.01)

(52) U.S. Cl.
  CPC ..... *B60W 2520/10* (2013.01); *B60W 2552/00* (2020.02); *B60W 2554/00* (2020.02); *B60W 2555/20* (2020.02); *B60W 2556/00* (2020.02); *G05D 1/0088* (2013.01)

(58) Field of Classification Search
  CPC ..... B60W 2555/20; B60W 2050/0088; B60W 2520/10; G05D 1/0088
  See application file for complete search history.

(56) References Cited

U.S. PATENT DOCUMENTS

| | | | |
|---|---|---|---|
| 5,574,641 A * | 11/1996 | Kawakami | A61B 5/18 340/576 |
| 6,218,947 B1 * | 4/2001 | Sutherland | G08B 21/06 340/545.4 |
| 7,894,951 B2 | 2/2011 | Norris | |
| 8,818,608 B2 | 8/2014 | Cullinane | |
| 9,135,803 B1 | 9/2015 | Fields | |
| 9,688,288 B1 | 6/2017 | Lathrop | |
| 9,823,657 B1 | 11/2017 | Palmer | |
| 10,268,195 B2 | 4/2019 | Majumdar | |
| 10,479,369 B2 | 11/2019 | Schneider | |
| 10,589,750 B2 | 3/2020 | Palmer | |
| 10,705,523 B2 | 7/2020 | Palmer | |
| 10,732,627 B1 | 8/2020 | Roberson | |
| 10,783,507 B1 | 9/2020 | Votolato | |
| 10,793,160 B2 | 10/2020 | Palmer | |
| 10,807,527 B1 | 10/2020 | Mauricia | |
| 10,864,920 B1 | 12/2020 | Donnelly | |
| 11,023,629 B1 | 6/2021 | Konrardy | |
| 11,061,399 B2 | 7/2021 | Bhalla | |
| 11,198,447 B2 | 12/2021 | Palmer | |
| 11,718,328 B2 | 8/2023 | Bieg | |
| 2006/0220883 A1 | 10/2006 | Matos | |
| 2006/0287787 A1 | 12/2006 | Engstrom | |
| 2008/0087488 A1 | 4/2008 | Palmer | |
| 2008/0231461 A1 | 9/2008 | Sanchez | |
| 2011/0224849 A1 | 9/2011 | Braly | |
| 2011/0241862 A1 | 10/2011 | Debouk | |
| 2011/0313259 A1 | 12/2011 | Hatakeyama | |
| 2013/0116856 A1 | 5/2013 | Schadeck | |
| 2013/0131907 A1 | 5/2013 | Green | |
| 2014/0135598 A1 | 5/2014 | Weidl | |
| 2014/0156133 A1 | 6/2014 | Cullinane | |
| 2014/0375462 A1 | 12/2014 | Biondo | |
| 2015/0006012 A1 | 1/2015 | Kammel | |
| 2015/0066282 A1 | 3/2015 | Yopp | |
| 2015/0066284 A1 | 3/2015 | Yopp | |
| 2015/0070160 A1 | 3/2015 | Davidsson | |
| 2015/0134226 A1 | 5/2015 | Palmer | |
| 2015/0142244 A1 | 5/2015 | You | |
| 2015/0149021 A1 | 5/2015 | Duncan | |
| 2015/0314780 A1 | 11/2015 | Stenneth | |
| 2016/0041553 A1 | 2/2016 | Sato | |
| 2016/0090097 A1 | 3/2016 | Grube | |
| 2016/0140872 A1 | 5/2016 | Palmer | |
| 2016/0152182 A1 * | 6/2016 | Aoki | B60W 30/0956 340/435 |
| 2016/0280234 A1 | 9/2016 | Reilhac | |
| 2017/0021837 A1 | 1/2017 | Ebina | |
| 2017/0072850 A1 * | 3/2017 | Curtis | B60W 50/0097 |
| 2017/0088144 A1 | 3/2017 | Shibata | |
| 2017/0234689 A1 | 8/2017 | Gibson | |
| 2017/0349185 A1 | 12/2017 | McNew | |
| 2017/0364070 A1 | 12/2017 | Oba | |
| 2017/0368936 A1 | 12/2017 | Kojima | |
| 2018/0017968 A1 | 1/2018 | Zhu | |
| 2018/0050698 A1 | 2/2018 | Polisson | |
| 2018/0075538 A1 | 3/2018 | Konrardy | |
| 2018/0196427 A1 | 7/2018 | Majumdar | |
| 2018/0281807 A1 | 10/2018 | Minegishi | |
| 2018/0281808 A1 | 10/2018 | Minegishi | |
| 2018/0284774 A1 | 10/2018 | Kawamoto | |
| 2019/0019412 A1 * | 1/2019 | Roca | G08G 1/168 |
| 2019/0025827 A1 | 1/2019 | Palmer | |
| 2019/0129416 A1 | 5/2019 | Upmanue | |
| 2019/0138003 A1 | 5/2019 | Ming | |
| 2019/0184898 A1 | 6/2019 | Zheng | |
| 2019/0213429 A1 | 7/2019 | Sicconi | |
| 2019/0241122 A1 * | 8/2019 | Cohen | G08B 21/06 |
| 2019/0276046 A1 | 9/2019 | Palmer | |
| 2019/0278268 A1 | 9/2019 | Rezaeian | |
| 2019/0370577 A1 | 12/2019 | Meng | |
| 2020/0039535 A1 | 2/2020 | Marberger | |
| 2020/0055518 A1 | 2/2020 | Johnson | |
| 2020/0216092 A1 | 7/2020 | Palmer | |
| 2020/0272835 A1 | 8/2020 | Cheng | |
| 2020/0290646 A1 | 9/2020 | Safour | |
| 2020/0301417 A1 | 9/2020 | Palmer | |
| 2021/0016805 A1 | 1/2021 | Oba | |
| 2021/0061299 A1 | 3/2021 | Wang | |
| 2021/0086690 A1 | 3/2021 | Mauricia | |
| 2022/0024490 A1 | 1/2022 | Palmer | |

* cited by examiner

SYSTEMS AND METHODS FOR VERIFYING WHETHER VEHICLE OPERATORS ARE PAYING ATTENTION

FIELD OF THE DISCLOSURE

The present disclosure relates to systems and methods for verifying whether vehicle operators are paying attention.

BACKGROUND

In-vehicle technology to detect, after a vehicle event has occurred, whether a driver was paying attention, is known. For example, a video recording of the cabin may be analyzed by a human reviewer to reveal what the driver was doing just before an accident happened. In-vehicle technology to determine whether a driver is prepared to assume control of a vehicle that is being operated by an autonomous driving algorithm may be known.

SUMMARY

One aspect of the present disclosure relates to a system configured for verifying whether vehicle operators are paying attention during operation of a first vehicle. The system may include a set of sensors and one or more hardware processors configured by machine-readable instructions. The set of sensors may be configured to generate output signals conveying information related to a first vehicle operator. The processor(s) may be configured to make a first type of determination of at least one of an object on which attention of the first vehicle operator is focused during operation of the first vehicle and/or a direction in which attention of the first vehicle operator is focused during operation of the first vehicle. The first type of determination may be made multiple times in an ongoing manner and/or at regular intervals spanning at least 50 percent of a period of operation of the first vehicle, or another percentage. The first type of determination may be based on the generated output signals. The period may span at least a minute. The processor(s) may be configured to make a second type of determination regarding fatigue of the first vehicle operator during operation of the first vehicle. The second type of determination may be made multiple times in a second ongoing manner and/or at particular intervals spanning at least 50 percent of the period of operation of the first vehicle, or another percentage. The second type of determination may be based on the generated output signals. The processor(s) may be configured to make a third type of determination of at least one of a distraction level of the first vehicle operator and/or a fatigue level of the first vehicle operator. In some implementations, the distraction level may be based on the first type of determination. In some implementations, the fatigue level may be based on the second type of determination. The processor(s) may be configured to effectuate a notification regarding the third type of determination, responsive to at least one of the distraction level breaching a distraction threshold and/or the fatigue level breaching a fatigue threshold, to at least one of the first vehicle operator, a remote computing server, and/or another destination.

Another aspect of the present disclosure relates to a method for verifying whether vehicle operators are paying attention during operation of a first vehicle. The method may include generating output signals conveying information related to a first vehicle operator. The method may include making a first type of determination of at least one of an object on which attention of the first vehicle operator is focused during operation of the first vehicle and/or a direction in which attention of the first vehicle operator is focused during operation of the first vehicle. The first type of determination may be made multiple times in an ongoing manner and/or at regular intervals spanning at least 50 percent of a period of operation of the first vehicle, or another percentage. The first type of determination may be based on the generated output signals. The period may span at least a minute. The method may include making a second type of determination regarding fatigue of the first vehicle operator during operation of the first vehicle. The second type of determination may be made multiple times in a second ongoing manner and/or at particular intervals spanning at least 50 percent of the period of operation of the first vehicle, or another percentage. The second type of determination may be based on the generated output signals. The method may include making a third type of determination of at least one of a distraction level of the first vehicle operator and/or a fatigue level of the first vehicle operator. In some implementations, the distraction level may be based on the first type of determination. In some implementations, the fatigue level may be based on the second type of determination. The method may include effectuating a notification regarding the third type of determination, responsive to at least one of the distraction level breaching a distraction threshold and/or the fatigue level breaching a fatigue threshold, to at least one of the first vehicle operator, a remote computing server, and/or another destination.

As used herein, any association (or relation, or reflection, or indication, or correspondency) involving servers, processors, client computing platforms, output signals, sensors, determinations, detections, vehicles, vehicle operators, directions, distraction levels, fatigue levels, alertness levels, readiness levels, periods of operation, notifications, challenges, responses, modifications, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
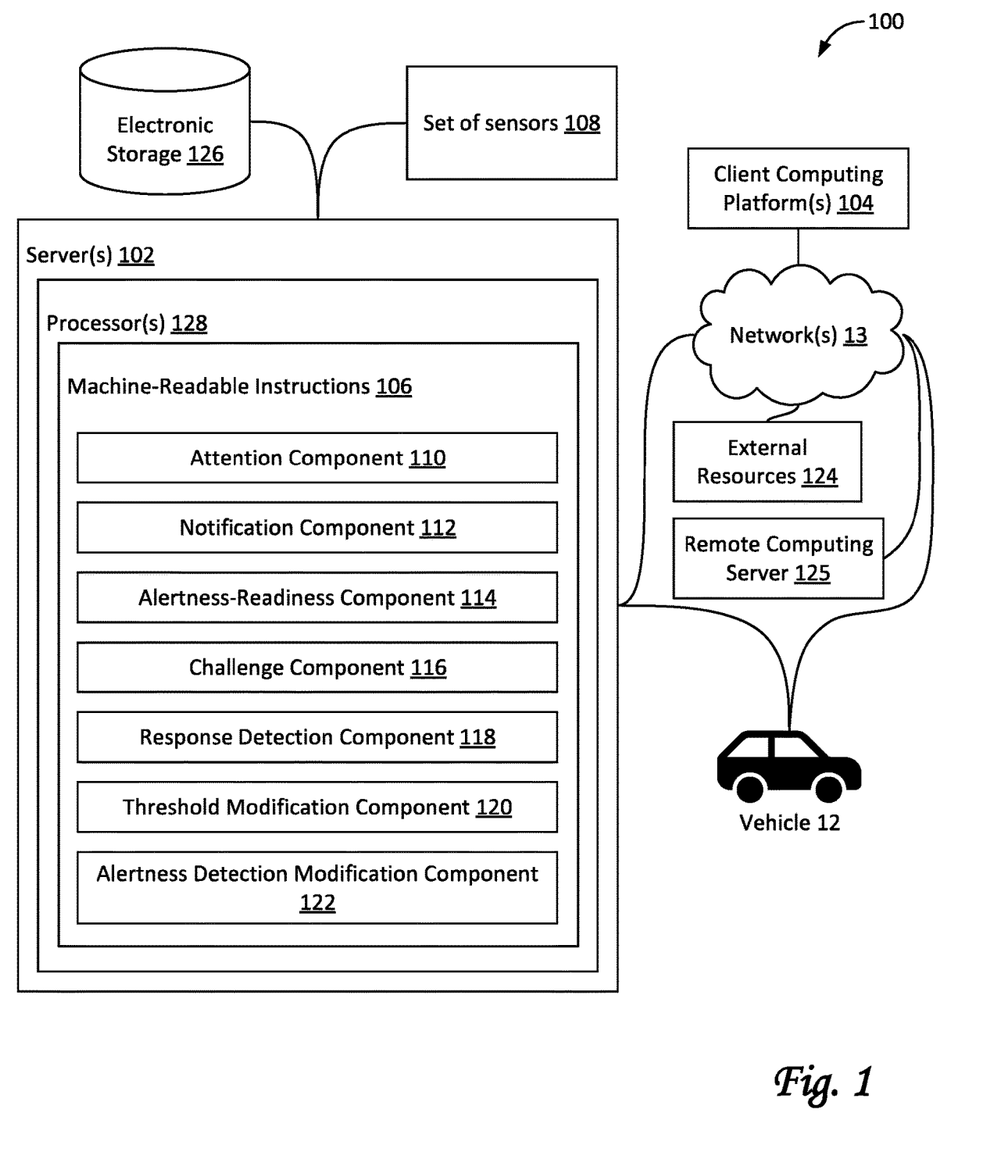
FIG. 1 illustrates a system configured for verifying whether vehicle operators are paying attention during operation of a vehicle, in accordance with one or more implementations.

FIG. 1 illustrates a system 100 configured for verifying whether vehicle operators are paying attention, in accordance with one or more implementations. As described herein, verifying whether an individual vehicle operator is paying attention may be done in an ongoing manner, e.g., continuously during operation of the vehicle, and/or intermittently during operation of the vehicle. By virtue of this verification, an individual vehicle operator may pay more attention. In other words, testing for alertness and/or readiness may improve the alertness and/or readiness.

In some implementations, system 100 may include one or more of server(s) 102, electronic storage 126, a set of sensors 108, network(s) 13, client computing platform(s) 104, external resources 124, a remote computing server 125, and/or other components. System 100 and/or components thereof may be carried and/or otherwise supported by one or more vehicles (e.g., a first vehicle, a second vehicle, a third vehicle, and so forth), including but not limited to a vehicle 12. In some implementations, individual vehicles (e.g., vehicle 12) may carry and/or otherwise support system 100 and/or components thereof. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. In some implementations, users may access system 100 via client computing platform(s) 104.

Individual vehicles may include a set of resources for data processing and/or electronic storage, including but not limited to persistent storage. Individual vehicles may include a set of sensors (e.g., set of sensors 108). In some implementations, individual vehicles may be configured to detect vehicle events, e.g., based on output signals generated by one or more sensors.

Set of sensors 108 may be configured to generate output signals conveying information related to (operation of) vehicle 12, a vehicle operator of vehicle 12, and/or a context of vehicle 12 (e.g., related to the surroundings of vehicle 12). In some implementations, operation of vehicle 12 may be actively and primarily controlled by a vehicle operator (i.e., a human operator). In some implementations, operation of vehicle 12 may be actively and primarily controlled by an autonomous driving algorithm. In such a case, a human vehicle operator may take over (or be requested to take over) control of the autonomous driving algorithm, e.g., responsive to extreme and/or unconventional driving scenarios, or responsive to a failure or error-condition of the autonomous driving algorithm. In some implementations, a human vehicle operator and an autonomous driving algorithm may form a team that controls operations of vehicle 12 together.

Information related to the operation of vehicle 12 may include feedback information from one or more of the mechanical systems of vehicle 12, and/or other information. The mechanical systems of vehicle 12 may include, for example, the engine, the drive train, the lighting systems (e.g., headlights, brake lights), the braking system, the transmission, fuel delivery systems, and/or other mechanical systems. The mechanical systems of vehicle 12 may include one or more mechanical sensors, electronic sensors, and/or other sensors that generate the output signals (e.g., seat belt sensors, tire pressure sensors, etc.). In some implementations, at least one of sensors 14 may be a vehicle system sensor included in an Engine Control Module (ECM) system of vehicle 12.

In some implementations, set of sensors 108 may generate output signals conveying information related to a vehicle operator of vehicle 12, such as visual information, motion-related information, position-related information, biometric information, medical information, and/or other information. In some implementations, set of sensors 108 may include one or more sensors configured to generate output signals that convey information related to biological activity of the vehicle operator. In some implementations, such sensors may be wearable by the vehicle operator. In some implementations, such sensors may be placed in physical proximity to the vehicle operator to facilitate monitoring the biological activity of the vehicle operator. The information related to the biological activity of the vehicle operator may include heart rate, respiration rate, verbal expressions, responses to conditions in the physical environment in and/or around vehicle 12, and/or other characteristics of the vehicle operator. For example, one or more sensors in set of sensors 108 may generate an output based on a heart rate of the vehicle operator (e.g., a particular sensor may be a heart rate sensor located on the chest of the vehicle operator, and/or be configured as an optical sensor included in a bracelet on a wrist of the vehicle operator, and/or be located on another limb of the vehicle operator), movement of the vehicle operator (e.g., a particular sensor may include a bracelet around the wrist and/or ankle of the vehicle operator with an accelerometer such that physical reactions may be analyzed using actigraphy signals), changes in skin color of the vehicle operator (e.g., set of sensors 108 may include a camera that can detect changes in skin color of the vehicle operator and infer vital signs such as heart rate, breathing rate, and/or other vital signs from the changes in color), respiration of the vehicle operator, brain waves of the vehicle operator (e.g., a particular sensor may generate output signals related to an electroencephalogram (EEG) of the vehicle operator), and/or other characteristics of the vehicle operator.

In some implementations, set of sensors 108 may generate output signals conveying information related to the context of vehicle 12, such as information related to the environment in and/or around vehicle 12. The vehicle environment may include spaces in and around an interior and an exterior of vehicle 12. The information related to the context of vehicle 12 may include information related to movement of vehicle 12, an orientation of vehicle 12, a geographic position of vehicle 12, a spatial position of vehicle 12 relative to other objects, a tilt angle of vehicle 12, an inclination/declination angle of vehicle 12, and/or other information. In some implementations, the output signals conveying the information related to the context of vehicle 12 may be generated via non-standard aftermarket sensors installed in vehicle 12. Set of sensors 108 may include, for example, one or more video cameras, one or more microphones, an accelerometer, a gyroscope, a geolocation sensor (e.g., a Global Positioning System or GPS device), a radar detector, a magnetometer, radar (e.g., for measuring distance of a leading vehicle), and/or other sensors.

Individual sensors in set of sensors 108 may include, by way of non-limiting example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, global positioning system sensors, a tilt sensor, a motion sensor, a vibration sensor, an image sensor, a camera, an ultrasonic sensor, an infrared sensor, a light sensor, a microphone, an air speed sensor, a ground speed sensor, an altitude sensor, medical sensors (including but not limited to blood pressure sensor, pulse oximeter, heart rate sensor, etc.), degree-of-freedom sensors (e.g. 6-DOF and/or 9-DOF sensors), a compass, and/or other sensors. As used herein, the term "motion sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files.

In some implementations, individual sensors in set of sensors 108 may include image sensors, cameras, depth sensors, remote sensors, and/or other sensors. As used herein, the terms "camera" and/or "image sensor" may include any device that captures image information, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, distance information, and/or other information. Information captured by one or more sensors may be marked, timestamped, annotated, and/or otherwise processed such that information captured by other sensors can be synchronized, aligned, annotated, and/or otherwise associated therewith. For example, video information captured by an image sensor may be synchronized with information captured by an accelerometer or other sensor. In some implementations, set of sensors 108 may include multiple cameras positioned around the vehicle and synchronized together to provide a 360-degree view of the inside of a vehicle and/or a 360-degree view of the outside of a vehicle. In some implementations, an image sensor may be integrated with electronic storage such that captured information may be (processed and) stored in the integrated embedded storage. In some implementations, an image sensor may be configured to transfer captured information to remote electronic storage media, e.g. through "the cloud."

Although set of sensors 108 is depicted in FIG. 1 as a single element, this is not intended to be limiting. In some implementations, set of sensors 108 may be configured to generate output signals continuously, in an on-going manner, and/or at regular or irregular intervals during operation of vehicle 12. In some implementations, set of sensors 108 may be configured to generate output signals multiple times in an ongoing manner and/or at regular intervals spanning at least 50 percent of a period of operation of vehicle 12. In some implementations, that percentage may be 80 percent, 90 percent, 95 percent, and/or another percentage. In some implementations, the period of operation of vehicle 12 may coincide with movement of vehicle 12. In some implementations, the period of operation of vehicle 12 may coincide with the engine status of vehicle 12 (e.g., engine turned on). In some implementations, the period of operation of vehicle 12 may coincide with the ignition status of vehicle 12 (e.g., ignition turned on). In some implementations, the period of operation of vehicle 12 may coincide with the electronic status of vehicle 12 (e.g., electronics turned on). In some implementations, the period of operation of vehicle 12 may coincide with a trip of vehicle 12. In some implementations, the period of operation of vehicle 12 may coincide with vehicle 12 being actively and primarily controlled by a human vehicle operator.

Server(s) 102 may be configured by machine-readable instructions 106. Machine-readable instructions 106 may include one or more instruction components. The instruction components may include computer program components. The instruction components may include one or more of attention component 110, notification component 112, alertness-readiness component 114, challenge component 116, response detection component 118, threshold modification component 120, alertness detection modification component 122, and/or other instruction components.

Attention component 110 may be configured to make different types of determinations during operation of vehicle 12. The different types of determinations may include a first type of determinations, a second type of determinations, a third type of determinations, and/or other types of determinations. Determinations by attention component 110 may be determined based on output signals generated by set of sensors 108. In some implementations, different types of determinations by attention component 110 may be made multiple times in an ongoing manner and/or at regular intervals spanning at least a particular percentage of a period of operation of vehicle 12. In some implementations, the particular percentage may be 50 percent, 60 percent, 70 percent, 80 percent, 90 percent, 95 percent, and/or another percentage. In some implementations, the period of operation of vehicle 12 may span at least a minute, at least 30 minutes, at least an hour, and/or another period of time. In some implementations, the period of operation of vehicle 12 may span an individual trip of vehicle 12. For example, in some implementations, a trip may be defined by continuous engine operation. For example, a trip may start at the moment of ignition, and end when the engine is turned off. For example, in some implementations, a trip may be defined by continuous movement. For example, a trip may start at the moment a vehicle starts moving, and end when the vehicle stops moving for more than a particular period (such as, e.g., 1 minute, 5 minutes, 10 minutes, and/or another period of time). Other definitions of the start and end of an individual trip are envisioned within the scope of this disclosure.

In some implementations, the first type of determinations by attention component 110 may include determinations of an object on which attention of the vehicle operator is focused during operation of vehicle 12. Alternatively, and/or simultaneously, the first type of determinations may include determinations of a direction in which attention of the vehicle operator is focused during operation of the vehicle 12. Objects on which attention of the vehicle operator is focused may include objects within vehicle 12 and objects outside of vehicle 12. By way of non-limiting example, objects within vehicle 12 may include the steering wheel, the dashboard, the speedometer, the navigation system, the mirrors, the radio, a user interface that is part of vehicle 12, the center console, the gearshift, other passengers, the phone of the vehicle operator, and/or other objects. By way of non-limiting example, objects outside of vehicle 12 may include the road ahead of vehicle 12, signage on or near the road, other vehicles on or near the road, advertisements along the road, clouds, birds, buildings, and/or other objects. For longer periods of time, determinations of this first type may form a sequence of objects on which attention of the vehicle operator is focused in succession. For example, a particular sequence may include the road, the speedometer, the road, the rear-view mirror, the road, the vehicle operator's phone, signs along the side of the road, an overhead traffic light, nearby traffic, the road, a side mirror, the radio, the road, and so forth.

In some implementations, determinations by attention component 110 of a direction in which attention of the vehicle operator is focused during operation of the vehicle 12 may be based on analyzing the position and/or orientation of one or more of the individual vehicle operator, the head of the individual vehicle operator, the eyes of the individual vehicle operator, and/or other parts of the individual vehicle operator. For example, an image sensor may capture visual information that includes at least part of the individual vehicle operator, and such visual information may be analyzed, e.g. using computer vision techniques, three-dimensional modeling techniques, signal-processing techniques, pattern recognition, and/or other mechanisms of analyzing visual information (including but not limited to automated systems that approximate functionality that the human visual system can perform). In some implementations, such a direction may be a vector, e.g., a two-dimensional or three-dimensional vector originating from the individual vehicle operator. In some implementations, an individual determination of such a direction may be made once per second, once per 3 seconds, once per 5 seconds, once per 10 seconds, and/or using other intervals. For longer periods of time, determinations of these directions may form a sequence of directions in which attention of the vehicle operator is focused in succession. For example, a particular sequence may include the general direction of the road ahead, the general direction of the dashboard, the general direction of the road ahead, the general direction of a mirror, the general direction of the vehicle operator's lap or phone, the general direction of the passengers in the back of the vehicle, and so forth.

In some implementations, determinations by attention component 110 of directions in which attention of the vehicle operator is focused may be used to determine the object on which attention of the vehicle operator is focused.

In some implementations, the second type of determinations by attention component 110 may include determinations regarding fatigue of the vehicle operator of vehicle 12. In some implementations, determinations regarding fatigue may be based on detections of fatigue indicators. In some implementations, individual fatigue indicators may be momentary or fleeting. By way of non-limiting example, fatigue indicators may include one or more of the eyes of the individual vehicle operator being closed, the rate of blinking, the eyes of the individual operator momentarily opening extra wide, a particular heart rate of the individual vehicle operator (e.g., the heart rate slowing down during driving), a particular breathing rate of the individual vehicle operator, (e.g., the breathing rate slowing down during driving), head bobbing by the individual vehicle operator, vigorous head shaking by the individual vehicle operator, a slumped posture of the individual vehicle operator, certain body movements by the individual vehicle operator, and/or other indicators. In some implementations, such detections may be based on analyzing one or more of captured visual information, generated output signals from biometric sensors, and/or other information.

In some implementations, the third type of determinations by attention component 110 may include determinations of a distraction level of the vehicle operator of vehicle 12. Alternatively, and/or simultaneously, the third type of determinations by attention component 110 may include determinations of a fatigue level of the vehicle operator of vehicle 12.

Figure 3A:
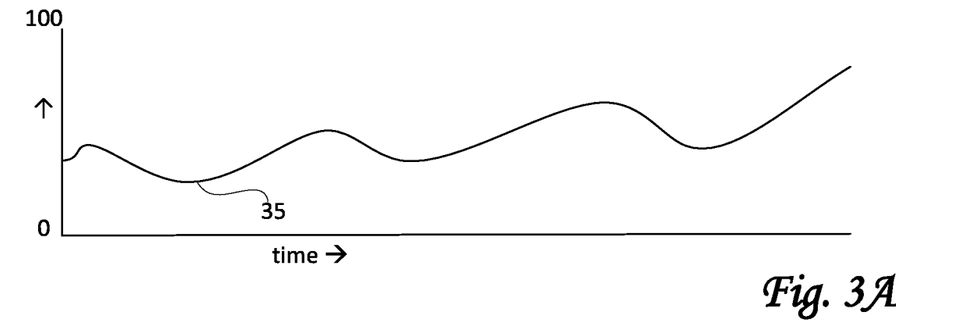
FIG. 3A-3B illustrate exemplary graphs of different types of determinations over time, pertaining to a vehicle operator, as may be used by a system configured for verifying whether vehicle operators are paying attention during operation of a vehicle, in accordance with one or more implementations.

For example, the distraction level may be determined based on an analysis of the first type of determinations by attention component 110, and/or on other information. In some implementations, individual determinations of the first type may correspond to numerical scores, which may be aggregated to determine the distraction level. By way of non-limiting example, objects on which attention of an individual vehicle operator arguably should be focused such as the steering wheel or the road ahead may correspond to a low numerical score, e.g., from 0-10. By way of non-limiting example, directions in which attention of the individual vehicle operator arguably should be focused such as the general direction of the road ahead may correspond to a low numerical score, e.g., from 0-10. By way of non-limiting example, objects on which attention of the individual vehicle operator arguably should not be focused (or not for long) such as the radio or a phone may correspond to a high numerical score, e.g., from 80-90. By way of non-limiting example, directions in which attention of the individual vehicle operator arguably should not be focused (or not for long) such as the passengers in the back of vehicle 12 may correspond to a high numerical score, e.g., from 90-100. By aggregating scores over time, the distraction level may be determined as a numerical score over time, say, between 0 and 100. By way of non-limiting example, FIG. 3A illustrates a graph 35 that could be of a distraction level determined over time, pertaining to a particular vehicle operator.

For example, the fatigue level may be determined based on an analysis of the second type of determinations by attention component 110, and/or on other information. In some implementations, individual determinations of the second type may correspond to numerical scores, which may be aggregated to determine the fatigue level. By way of non-limiting example, fatigue indicators indicating a low level of fatigue such as active head moment between appropriate objects and/or directions of attention may correspond to a low numerical score, e.g., from 0-10. By way of non-limiting example, fatigue indicators indicating a high level of fatigue such as eyes being closed for more than two seconds may correspond to a high numerical score, e.g., from 80-90. By way of non-limiting example, certain fatigue indicators such as the vehicle operator slumping in his or her seat may correspond to a high numerical score, e.g., from 90-100. By aggregating scores over time, the fatigue level may be determined as a numerical score, say, between 0 and 100. By way of non-limiting example, FIG. 3A illustrates a graph 35 that could be of a fatigue level determined over time, pertaining to a particular vehicle operator.

Figure 3B:
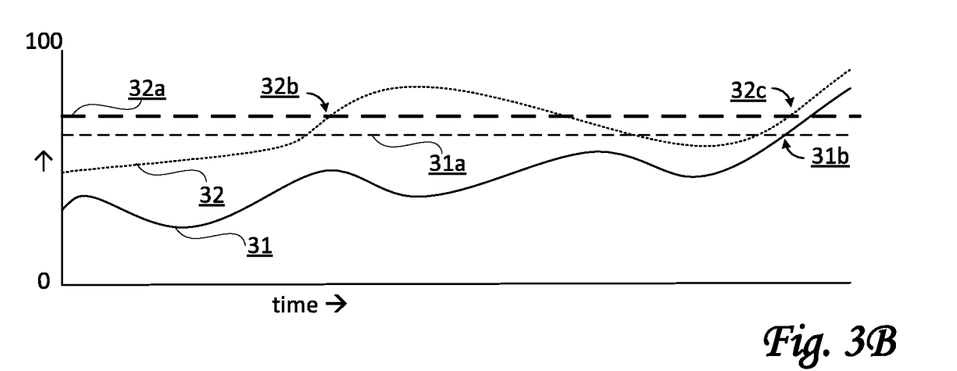

Notification component 112 may be configured to effectuate notifications. The notifications may include notifications to individual vehicle operators, one or more fleet managers, remote computing servers, and/or other destinations. In some implementations, notifications by notification component 112 may occur responsive to one or more conditions. For example, a particular notification may be transmitted responsive to the distraction level breaching a distraction threshold. For example, a particular notification may be made responsive to the fatigue level breaching a fatigue threshold. In some implementations, notification component 112 may be configured to compare the distraction level with a distraction threshold, the fatigue level with a fatigue threshold, and/or other levels with other thresholds. By way of non-limiting example, FIG. 3B illustrates a distraction level 31 and a fatigue level 32 determined over time (so that these levels overlap), pertaining to a particular vehicle operator. Distraction level 31 may be compared with a distraction threshold 31a, which is breached at a moment 31b. Fatigue level 32 may be compared with a fatigue threshold 32a, which is breached at a moment 32b and at a moment 32c. At moment 32b distraction level 31 is below distraction threshold 31a, but at moment 32c both distraction level 31 and fatigue level 32 are above their respective threshold levels. In some implementations, notification component 112 may be configured to effectuate notifications at all breaches, which occurs in FIG. 3B at moment 31b, moment 32b, and moment 32c. In some implementations, notification component 112 may be configured to effectuate notifications at all simultaneous breaches of multiple thresholds, which occurs in FIG. 3B at moment 32c. Other logical combinations and/or sequences of different breaches of thresholds are envisioned within the scope of this disclosure.

Referring to FIG. 1, alertness-readiness component 114 may be configured to determine alertness levels of individual vehicle operators. The alertness level may represent whether a particular vehicle operator is paying attention in a manner that is appropriate for the particular vehicle operator being in active and primary control of the operation of vehicle 12. By way of non-limiting example, the alertness level may be based on one or more of the first type of determination, the second type of determination, and the third type of determination. For example, in some implementations, a particular alertness level may be an aggregation of the distraction level and the fatigue level of a particular vehicle operator. In some implementations, notification component 112 may be configured to compare the alertness level with an alertness threshold, and/or effectuate a notification responsive to a breach of the alertness threshold. For example, a particular alertness threshold may be if either the distraction level or the fatigue level is more than 35, or if their combined total is more than 50.

In some implementations, alertness-readiness component 114 may be configured to determine readiness levels of individual vehicle operators. The readiness level may represent whether a particular vehicle operator is paying attention in a particular manner that is appropriate for vehicle 12 being actively and primarily controlled by an autonomous driving algorithm. By way of non-limiting example, the readiness level may be based on one or more of the first type of determination, the second type of determination, and the third type of determination. For example, in some implementations, a particular readiness level may be an aggregation of the distraction level and the fatigue level of a particular vehicle operator. In some implementations, notification component 112 may be configured to compare the readiness level with a readiness threshold, and/or effectuate a notification responsive to a breach of the readiness threshold. For example, a particular readiness threshold may be if either the distraction level or the fatigue level is more than 50, or if their combined total is more than 75. In some implementations, the readiness threshold may be higher than the alertness threshold.

Challenge component 116 may be configured to present challenges to the vehicle operators. In some implementations, challenges may include auditory and/or visual notifications for vehicle operators. In some implementations, challenges may be issued through user interfaces in vehicles, such as a particular user interface (not shown in FIG. 1) in vehicle 12. For example, a particular challenge may be a question posed to the vehicle operator, or a pattern presented to the particular vehicle operator. Individual challenges may correspond to expected responses by the vehicle operators, including but not limited to particular interactions by the particular vehicle operator with a user interface. For example, a challenge may be a simple arithmetic question, such as "what is 2 times 3?". In some implementations, a notification by notification component 112 may act as and/or include a challenge.

Response detection component 118 may be configured to detect interactions and/or other responses by vehicle operators. In some implementations, response detection component 118 may be configured to detect whether a particular vehicle operator provides a response to a particular challenge (presented by challenge component 116), and/or whether that particular response matches the corresponding expected response. In some implementations, responses by vehicle operators may be provided through a user interface. In some implementations, one or more of the second type of determination and the third type of determination (by attention component 110) may be further based on a detected response to a challenge. For example, the detected response to the arithmetic question above may be analyzed both for correctness and for reaction-speed (e.g., the time elapsed between presentation of the challenge and detection of the response). Incorrect responses may reduce the distraction level, the fatigue level, and/or other levels. Slow responses may reduce the distraction level, the fatigue level, and/or other levels.

Threshold modification component 120 may be configured to modify thresholds, including but not limited to the distraction threshold, the fatigue threshold, the alertness threshold, the readiness threshold, and/or other thresholds. In some implementations, modifications by threshold modification component 120 may be based on at least one of a speed of vehicle 12, traffic conditions around vehicle 12, local weather conditions, and/or local road surface conditions. For example, the fatigue threshold may be lowered in response to vehicle 12 going over 50 MPH. Alternatively, and/or simultaneously, in some implementations, modifications by threshold modification component 120 may be based on responses detected by response detection component 118. For example, the distraction threshold may be lowered in response to incorrect and/or slow responses. Alternatively, and/or simultaneously, in some implementations, modifications by threshold modification component 120 may be based on one or more thresholds being breached. For example, the fatigue threshold may be lowered responsive to the distraction threshold being breached.

In some implementations, alertness detection modification component 122 may be configured to modify determination of the alertness level based on at least one of a speed of vehicle 12, traffic conditions around the vehicle 12, local weather conditions, local road surface conditions, and/or other conditions or detections. For example, alertness detection modification component 112 may modify the operation of alertness-readiness component 114, e.g., by modifying one or more thresholds. Alternatively, and/or simultaneously, in some implementations, alertness detection modification component 122 may be configured to modify determination of the readiness level based on at least one of a speed of vehicle 12, traffic conditions around the vehicle 12, local weather conditions, local road surface conditions, and/or other conditions or detections.

In some implementations, server(s) 102, client computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 124 may be operatively linked via some other communication media.

A given client computing platform 104 may include one or more processors configured to execute computer program components. The computer program components may be configured to enable an expert or user associated with the given client computing platform 104 to interface with system 100 and/or external resources 124, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a smart watch, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Remote computing server 125 may be separate, discrete, and/or distinct from individual vehicles (such as vehicle 12), and/or system 100. In some implementations, remote computing server 125 may be configured to receive, analyze, and/or otherwise process information from one or more vehicles, including but not limited to vehicle 12. In some implementations, remote computing server 125 may be configured to receive notifications from vehicle 12, e.g., regarding determinations pertaining to whether the vehicle operator of vehicle 12 is and/or has been paying attention.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from client computing platform(s) 104, and/or other information that enables server(s) 102 to function as described herein.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor(s) 128 may be configured to execute components 110, 112, 114, 116, 118, 120, and/or 122, and/or other components. Processor(s) 128 may be configured to execute components 110, 112, 114, 116, 118, 120, and/or 122, and/or other components by software; hardware; firmware; some combination of software, hardware, and/or firmware; and/or other mechanisms for configuring processing capabilities on processor(s) 128. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 110, 112, 114, 116, 118, 120, and/or 122 are illustrated in FIG. 1 as being implemented within a single processing unit, in implementations in which processor(s) 128 includes multiple processing units, one or more of components 110, 112, 114, 116, 118, 120, and/or 122 may be implemented remotely from the other components. The description of the functionality provided by the different components 110, 112, 114, 116, 118, 120, and/or 122 described below is for illustrative purposes, and is not intended to be limiting, as any of components 110, 112, 114, 116, 118, 120, and/or 122 may provide more or less functionality than is described. For example, one or more of components 110, 112, 114, 116, 118, 120, and/or 122 may be eliminated, and some or all of its functionality may be provided by other ones of components 110, 112, 114, 116, 118, 120, and/or 122. As another example, processor(s) 128 may be configured to execute one or more additional components that may perform some or all of the functionality attributed below to one of components 110, 112, 114, 116, 118, 120, and/or 122.

Figure 2:
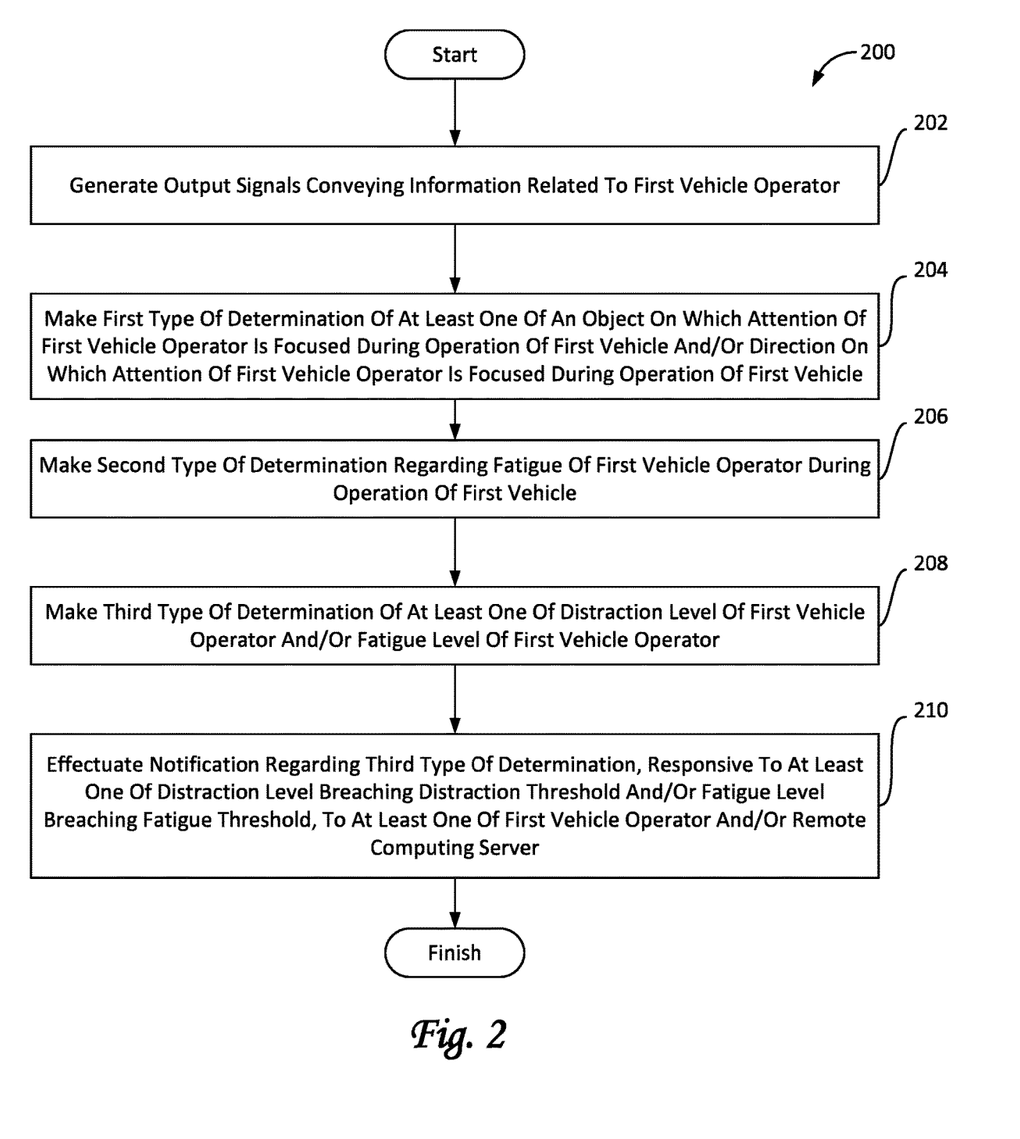
FIG. 2 illustrates a method for verifying whether vehicle operators are paying attention during operation of a vehicle, in accordance with one or more implementations.

FIG. 2 illustrates a method 200 for verifying whether vehicle operators are paying attention, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include generating output signals conveying information related to a first vehicle operator. Operation 202 may be performed by a set of sensors that is the same as or similar to set of sensors 108, in accordance with one or more implementations.

An operation 204 may include making a first type of determination of at least one of an object on which attention of the first vehicle operator is focused during operation of a first vehicle and/or a direction in which attention of the first vehicle operator is focused during operation of the first vehicle. The first type of determination may be made multiple times in an ongoing manner and/or at regular intervals spanning at least 50 percent of a period of operation of the first vehicle. The first type of determination may be based on the generated output signals. The period may span at least a minute. Operation 204 may be performed by one or more hardware processors configured by machine-readable instructions including a component that is the same as or similar to attention component 110, in accordance with one or more implementations.

An operation 206 may include making a second type of determination regarding fatigue of the first vehicle operator during operation of the first vehicle. The second type of determination may be made multiple times in a second ongoing manner and/or at particular intervals spanning at least 50 percent of the period of operation of the first vehicle. The second type of determination may be based on the generated output signals. Operation 206 may be performed by one or more hardware processors configured by machine-readable instructions including a component that is the same as or similar to attention component 110, in accordance with one or more implementations.

An operation 208 may include making a third type of determination of at least one of a distraction level of the first vehicle operator and/or a fatigue level of the first vehicle operator. The distraction level may be based on the first type of determination. The fatigue level may be based on the second type of determination. Operation 208 may be performed by one or more hardware processors configured by machine-readable instructions including a component that is the same as or similar to attention component 110, in accordance with one or more implementations.

An operation 210 may include effectuating a notification regarding the third type of determination, responsive to at least one of the distraction level breaching a distraction threshold and/or the fatigue level breaching a fatigue threshold, to at least one of the first vehicle operator and/or a remote computing server. Operation 210 may be performed by one or more hardware processors configured by machine-readable instructions including a component that is the same as or similar to notification component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for verifying whether vehicle operators are paying attention, the system comprising:
   a set of sensors configured to generate output signals conveying information related to a first vehicle operator during a period of operation of a first vehicle; and
   one or more hardware processors configured by machine-readable instructions to:
      make a first type of determination regarding an alertness level of the first vehicle operator during the operation of the first vehicle, wherein the alertness level represents whether the first vehicle operator is paying attention in a manner that is appropriate for being in active control of the operation of the first vehicle;
      make a second type of determination regarding a fatigue level of the first vehicle operator during the operation of the first vehicle, wherein the second type of determination is based on the generated output signals;
      modify both of (i) an alertness threshold and (ii) a fatigue threshold, wherein modifications are based on a current speed of the first vehicle; and
      subsequent to the modifications and responsive to both of (i) the alertness level breaching the alertness threshold and (ii) the fatigue level breaching the fatigue threshold, effectuate a notification to at least one of the first vehicle operator and a remote computing server.

2. The system of claim 1, wherein the one or more hardware processors are further configured by machine-readable instructions to:
   make a third type of determination regarding a distraction level of the first vehicle operator based on a direction in which attention of the first vehicle operator is focused during the operation of the first vehicle;
   wherein the notification is further responsive to the distraction level breaching a distraction threshold.

3. The system of claim 2, wherein the one or more hardware processors are further configured by machine-readable instructions to:
   modify the distraction threshold based on the current speed of the first vehicle.

4. The system of claim 1, wherein the first vehicle operator is actively participating in the operation of the first vehicle during the period of operation.

5. The system of claim 1, wherein the operation of the first vehicle is actively and primarily controlled by an autonomous driving algorithm.

6. The system of claim 1, wherein the period of operation of the first vehicle spans a trip of the first vehicle.

7. The system of claim 1, wherein the first type of determination is made multiple times in an ongoing manner spanning at least 50 percent of the period of operation of the first vehicle.

8. A method for verifying whether vehicle operators are paying attention, the method comprising:
generating output signals conveying information related to a first vehicle operator during a period of operation of a first vehicle;
making a first type of determination regarding an alertness level of the first vehicle operator during the operation of the first vehicle, wherein the alertness level represents whether the first vehicle operator is paying attention in a manner that is appropriate for being in active control of the operation of the first vehicle;
making a second type of determination regarding a fatigue level of the first vehicle operator during the operation of the first vehicle, wherein the second type of determination is based on the generated output signals;
modifying both of (i) an alertness threshold and (ii) a fatigue threshold, wherein modifications are based on a current speed of the first vehicle; and
subsequent to the modifications and responsive to both of (i) the alertness level breaching the alertness threshold and (ii) the fatigue level breaching the fatigue threshold, effectuating a notification to at least one of the first vehicle operator and a remote computing server.

9. The method of claim 8, further comprising:
making a third type of determination regarding a distraction level of the first vehicle operator based on a direction in which attention of the first vehicle operator is focused during the operation of the first vehicle;
wherein the notification is further responsive to the distraction level breaching a distraction threshold.

10. The method of claim 9, further comprising:
modifying the distraction threshold based on the current speed of the first vehicle.

11. The method of claim 8, wherein the first vehicle operator is actively participating in the operation of the first vehicle during the period of operation.

12. The method of claim 8, wherein the operation of the first vehicle is actively and primarily controlled by an autonomous driving algorithm.

13. The method of claim 8, wherein the period of operation of the first vehicle spans a trip of the first vehicle.

14. The method of claim 8, wherein the first type of determination is made multiple times in an ongoing manner spanning at least 50 percent of the period of operation of the first vehicle.

* * * * *